United States Patent
Kato

(10) Patent No.: US 10,865,308 B1
(45) Date of Patent: Dec. 15, 2020

(54) ADDITION-CURABLE LIQUID SILICONE RUBBER COMPOSITION

(71) Applicant: SHIN-ETSU CHEMICAL CO., LTD., Tokyo (JP)

(72) Inventor: Nobu Kato, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 270 days.

(21) Appl. No.: 16/097,766

(22) PCT Filed: Apr. 7, 2017

(86) PCT No.: PCT/JP2017/014513
§ 371 (c)(1),
(2) Date: Oct. 30, 2018

(87) PCT Pub. No.: WO2017/217088
PCT Pub. Date: Dec. 21, 2017

(30) Foreign Application Priority Data

Jun. 17, 2016 (JP) ................................. 2016-120793

(51) Int. Cl.
| | | |
|---|---|---|
| C08L 83/06 | (2006.01) | |
| C08G 77/20 | (2006.01) | |
| C08G 77/12 | (2006.01) | |
| C08G 77/50 | (2006.01) | |
| C08G 77/08 | (2006.01) | |

(52) U.S. Cl.
CPC .............. *C08L 83/06* (2013.01); *C08G 77/08* (2013.01); *C08G 77/12* (2013.01); *C08G 77/20* (2013.01); *C08G 77/50* (2013.01); *C08L 2205/025* (2013.01); *C08L 2205/035* (2013.01)

(58) Field of Classification Search
CPC ... C08L 83/04; C08L 2205/025; C08G 77/12; C08G 77/20; B01J 23/40
See application file for complete search history.

(56) References Cited

U.S. PATENT DOCUMENTS

| | | |
|---|---|---|
| 2014/0051806 A1 | 2/2014 | Kato |
| 2016/0096984 A1 | 4/2016 | Matsumoto |
| 2017/0081515 A1 | 3/2017 | Kato et al. |

FOREIGN PATENT DOCUMENTS

| | | | |
|---|---|---|---|
| EP | 1 361 253 A1 | | 11/2003 |
| JP | 2003-321609 A | | 11/2003 |
| JP | 2011-46826 A | | 3/2011 |
| JP | 2011046826 | * | 3/2011 |
| JP | 2013-64089 A | | 4/2013 |
| JP | 2013-64090 A | | 4/2013 |
| JP | 2014-37507 A | | 2/2014 |
| WO | WO 2014/181657 A1 | | 11/2014 |
| WO | WO 2015/178140 A1 | | 11/2015 |

OTHER PUBLICATIONS

International Search Report (PCT/ISA/210) issued in PCT/JP2017/014513, dated Jul. 4, 2017.
Written Opinion of the International Searching Authority (PCT/ISA/237) issued in PCT/JP2017/014513, dated Jul. 4, 2017.

* cited by examiner

*Primary Examiner* — Kuo Liang Peng
(74) *Attorney, Agent, or Firm* — Birch, Stewart, Kolasch & Birch, LLP

(57) ABSTRACT

Provided is an addition-curable liquid silicone rubber composition which has good curability and still provides a silicone rubber having a durometer type A hardness of 5-15 as measured after being cured and a high tear strength. The addition-curable liquid silicone rubber composition contains (A) an alkenyl group-containing organopolysiloxane having two or more silicon atom-bonded alkenyl groups per molecule, and an average polymerization degree of 1,500 or less, and is liquid at 25° C., (B) (B-1) an organohydrogenpolysiloxane containing six or more silicon atom-bonded hydrogen atoms per molecule, and not having an aromatic group, (B-2) an organohydrogenpolysiloxane containing 3-5 silicon atom-bonded hydrogen atoms per molecule, and not having an aromatic group, (B-3) an organohydrogenpolysiloxane containing 1 or 2 silicon atom-bonded hydrogen atoms per molecule, and not having an aromatic group, (C) a fumed silica having a BET specific surface area of 130 $m^2/g$ or more, and (D) an addition reaction catalyst.

7 Claims, No Drawings

ADDITION-CURABLE LIQUID SILICONE RUBBER COMPOSITION

TECHNICAL FIELD

This invention relates to an addition-curable liquid silicone rubber composition.

BACKGROUND ART

Because of heat resistance, freeze resistance, safety, appearance (transparency), touch, and durability, silicone rubber is widely used as a material for molding infant toys, dishes and toothbrushes, especially bottle nipples and baby pacifiers. In particular, silicone rubber compositions of addition reaction cure type are favorably used in these applications in view of safety, that is, because they do not form by-products resulting from decomposition of organic peroxides as in silicone rubber compositions of organic peroxide cure type.

While bottle nipples of silicone rubber which are currently in widespread use have a Durometer type A hardness of 30 to 50, nipples having a lower hardness are desired in order to enable diversification of design or for babies with weak suction force. Also, one of the applications of low hardness silicone rubber is to use low hardness silicone rubber in a portion of a mask which comes in contact with the face. When low hardness rubber is used as mask material, it may mitigate discomfort upon wearing. Nevertheless, in an attempt to reduce the amount of reinforcing silica loaded in order to formulate a lower hardness silicone rubber, the resulting rubber loses strength so that a molded rubber may be cracked when it is taken out of the mold after molding, or the rubber may be readily broken during service. In another attempt to tailor the balance of addition cross-linking in order to formulate a lower hardness silicone rubber without reducing reinforcing silica, the resulting rubber becomes inelastic or sticky on the surface. Bottle nipples and masks made of such rubber give a discomfort touch.

To solve the outstanding problems, Patent Document 1 (JP-A 2003-321609) proposes a method of adding silicone gum to a liquid silicone rubber composition for overcoming the hardness reduction and sticky feel of silicone rubber. However, when the hardness of rubber is reduced to 15 or lower by the method of Patent Document 1, there arise problems including sticky rubber surface, poor curability, and an excessively long vulcanization time during molding.

PRIOR ART DOCUMENTS

Patent Documents

Patent Document 1: JP-A 2003-321609

SUMMARY OF INVENTION

Technical Problem

An object of the invention, which has been made to ameliorate the above-mentioned circumstances, is to provide an addition-curable liquid silicone rubber composition which contains a specific organohydrogenpolysiloxane so that it remains satisfactorily curable and yields a silicone rubber having a hardness of 5 to 15 on Durometer type A scale and a high tear strength after curing.

Solution to Problem

Making extensive investigations to attain the above object, the inventor has found that by combining an organopolysiloxane having at least two silicon-bonded alkenyl groups per molecule and an average degree of polymerization of up to 1,500, the organopolysiloxane being liquid at 25° C., with a plurality of organohydrogenpolysiloxanes each containing a specific number of silicon-bonded hydrogen atoms per molecule and free of an aromatic group, and reinforcing silica, there is obtained an addition-curable liquid silicone rubber composition which remains fully curable and yields a low hardness silicone rubber having a hardness of 5 to 15 on Durometer type A scale and a tear strength (crescent test piece) of at least 10 kN/m after curing. The invention is predicated on this finding.

Accordingly, the invention provides an addition-curable liquid silicone rubber composition as defined below.

[1] An addition-curable liquid silicone rubber composition comprising the following components (A) to (D):

(A) 100 parts by weight of an alkenyl-containing organopolysiloxane having at least two silicon-bonded alkenyl groups per molecule and an average degree of polymerization of up to 1,500, the organopolysiloxane being liquid at 25° C., (B) an organohydrogenpolysiloxane consisting of the following components (B-1) to (B-3):

(B-1) an organohydrogenpolysiloxane containing at least 6 silicon-bonded hydrogen atoms per molecule and free of an aromatic group, (B-2) an organohydrogenpolysiloxane containing 3 to 5 silicon-bonded hydrogen atoms per molecule and free of an aromatic group, and (B-3) an organohydrogenpolysiloxane containing 1 or 2 silicon-bonded hydrogen atoms per molecule and free of an aromatic group, the moles of Si—H groups in the respective components relative to the total moles (total Si—H groups) of silicon-bonded hydrogen atoms (Si—H groups) in components (B-1), (B-2) and (B-3) are such that [Si—H groups in (B-1)]/[total Si—H groups] is 50 mol % to 80 mol %, [Si—H groups in (B-2)]/[total Si—H groups] is 5 mol % to 40 mol %, and [Si—H groups in (B-3)]/[total Si—H groups] is 5 mol % to 40 mol %, and a ratio of the moles of total Si—H groups to the total moles of alkenyl groups in the composition (total alkenyl groups) is such that [total Si—H groups]/[total alkenyl groups] is 1/1 to 3/1, (C) fumed silica having a BET specific surface area of at least 130 m$^2$/g, in an amount of 5 to 60 parts by weight per 100 parts by weight of components (A) and (B) combined, and (D) an addition reaction catalyst in an amount of 0.5 to 1,000 ppm of platinum group metal based on the total weight of components (A) and (B).

[2] The addition-curable liquid silicone rubber composition of [1], further comprising (E) an organopolysiloxane having an average degree of polymerization of at least 2,000, the organopolysiloxane being gum-like at 25° C., in an amount of 1 to 200 parts by weight per 100 parts by weight of component (A).

[3] The addition-curable liquid silicone rubber composition of [1] or [2], further comprising (F) an organopolysiloxane having an average degree of polymerization of up to 500 and free of a substituent active to addition reaction, the organopolysiloxane being liquid at 25° C., in an amount of 1 to 200 parts by weight per 100 parts by weight of component (A).

[4] The addition-curable liquid silicone rubber composition of any one of [1] to [3] wherein component (B-2) is an organohydrogenpolysiloxane capped with a dimethylhydrogensiloxy group in an amount of at least 50 mol % of ends on the average.

[5] The addition-curable liquid silicone rubber composition of any one of [1] to [4] wherein a molded composition after curing has a hardness of 5 to 15 on Durometer type A scale according to JIS K 6253-3:2012.

[6] The addition-curable liquid silicone rubber composition of any one of [1] to [5] wherein a molded composition after curing has a tear strength of at least 10 kN/m as measured on a crescent test piece according to JIS K 6252:2007.

[7] The addition-curable liquid silicone rubber composition of any one of [1] to [6] wherein in a vulcanization test using a torsional oscillating conical die type vulcanization tester according to JIS K 6300-2:2001, provided that T10 is a 10% cure time and T90 is a 90% cure time during measurement at 165° C. for 3 minutes, T10 is at least 3 seconds and T90 is up to 60 seconds.

Advantageous Effects of Invention

By combining specific amounts of components (A) to (D) according to the invention, there is obtained an addition-curable liquid silicone rubber composition which remains fully curable and yields a low hardness silicone rubber having a hardness of 5 to 15 on Durometer type A scale and a tear strength (crescent test piece) of at least 10 kN/m after curing.

DESCRIPTION OF EMBODIMENTS

Now the invention is described in detail.
(A) Alkenyl-Containing Organopolysiloxane Component (A) is an alkenyl-containing organopolysiloxane which is liquid at 25° C. and which is a main component or base polymer in the inventive composition. This organopolysiloxane contains at least two silicon-bonded alkenyl groups per molecule and has an average degree of polymerization of up to 1,500, and preferably contains the alkenyl group at the end of molecular chain. Component (A) in the inventive composition consists of the alkenyl-containing organopolysiloxane which is liquid at 25° C., i.e., having self-flowing properties.

The organopolysiloxane containing at least two silicon-bonded alkenyl groups per molecule may be a polysiloxane which is liquid at 25° C., represented by the average compositional formula (I):

$$R^1_a SiO_{(4-a)/2} \tag{1}$$

wherein $R^1$ is each independently a substituted or unsubstituted $C_1$-$C_{10}$, preferably $C_1$-$C_8$, monovalent hydrocarbon group, a is a positive number in the range of 1.5 to 2.8, preferably 1.8 to 2.5, more preferably 1.95 to 2.05.

Examples of the silicon-bonded, substituted or unsubstituted, $C_1$-$C_{10}$, preferably $C_1$-$C_7$, monovalent hydrocarbon group $R^1$ include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl, and phenylpropyl, alkenyl groups such as vinyl, allyl, propenyl, isopropenyl, butenyl, hexenyl, cyclohexenyl, and octenyl, and substituted forms of the foregoing in which one or more or all hydrogen atoms are substituted by halogen atoms (e.g., fluorine, bromine or chlorine), cyano or the like, for example, chloromethyl, chloropropyl, bromoethyl, trifluoropropyl and cyanoethyl. Preferably at least 90 mol % of all groups $R^1$ are methyl.

Of groups $R^1$, at least two groups must be alkenyl groups, preferably of 2 to 8 carbon atoms, more preferably of 2 to 6 carbon atoms, most preferably vinyl.

Notably, the content of alkenyl groups is preferably $1.0 \times 10^{-6}$ mol/g to $3.0 \times 10^{-3}$ mol/g, especially $1.0 \times 10^{-5}$ mol/g to $2.0 \times 10^{-3}$ mol/g of the organopolysiloxane. An organopolysiloxane having an alkenyl content of less than $1.0 \times 10^{-6}$ mol/g may have too low a rubber hardness and become gel. An alkenyl content in excess of $3.0 \times 10^{-3}$ mol/g may give an extremely high crosslinking density, resulting in rubber having an extremely high hardness and devoid of elasticity.

Basically, the organopolysiloxane has a linear structure which has a backbone composed of repeating diorganosiloxane units and is capped at either end of the molecular chain with a triorganosiloxy group although it may partially contain a branched structure or cyclic structure having monoorganosilsesquioxane units.

The alkenyl group may bond to the silicon atom at the molecular chain end or a silicon atom midway the molecular chain (at a molecular chain non-terminal position). The organopolysiloxane as component (A) preferably contains at least one alkenyl group bonded to the silicon atom at the molecular chain end (i.e., silicon atom in triorganosiloxy group), more preferably at least two alkenyl groups, and may or may not contain an alkenyl group bonded to a silicon atom midway the molecular chain (i.e., a silicon atom in diorganosiloxane unit or monoorganosilsesquioxane unit). If the organopolysiloxane does not contain at least one (preferably at least two) alkenyl group bonded to the silicon atom at the molecular chain end, sometimes a cured rubber having a low hardness and a high tear strength may not be obtained.

The organopolysiloxane should have an average degree of polymerization (DOP) of up to 1,500, typically 100 to 1,500, preferably 150 to 1,100. If DOP is less than 100, no sufficient rubbery feel may be obtained. If DOP exceeds 1,500, an increased viscosity hinders molding.

As used herein, the average degree of polymerization (DOP) refers to a number average DOP, i.e., average DOP as measured by gel permeation chromatography (GPC) versus polystyrene standards under the following conditions.
[Measurement Conditions]
Developing solvent: toluene
Flow rate: 1 mL/min
Detector: differential refractive index detector (RI)
Column: KF-805L×2 (Shodex)
Column temperature: 25° C.
Sample dose: 30 μL (toluene solution of 0.2 wt % concentration)

Examples of the organopolysiloxane as component (A) include molecular both end diorganoalkenylsiloxy-capped diorganopolysiloxanes, molecular both end organodialkenylsiloxy-capped diorganopolysiloxanes, molecular both end trialkenylsiloxy-capped diorganopolysiloxanes, molecular both end triorganosiloxy-capped diorganosiloxane/organoalkenylsiloxane copolymers, molecular both end diorganoalkenylsiloxy-capped diorganosiloxane/organoalkenylsiloxane copolymers, and diorganosiloxane/organoalkenylsiloxane copolymers capped with diorganoalkenylsiloxy at one end and with triorganosiloxy at the other end of the molecular chain. Inter alia, molecular both end diorganoalkenylsiloxy-capped diorganopolysiloxanes, molecular both end triorganosiloxy-capped diorganosiloxane/organoalkenylsiloxane copolymers, and molecular both end diorganoalkenylsiloxy-capped diorganosiloxane/ organoalkenylsiloxane copolymers are preferred. The "organo" group in each siloxane means a group like the substituted or unsubstituted monovalent hydrocarbon group (exclusive of alkenyl) represented by $R^1$ in formula (I).

Component (A) may be used singly or in admixture.

(B) Organohydrogenpolysiloxane

Component (B) is an organohydrogenpolysiloxane containing a silicon-bonded hydrogen atom (Si—H group) and free of an aromatic group, and defined as a mixture of the following components (B-1), (B-2) and (B-3): three types of organohydrogenpolysiloxanes. Component (B) serves as a curing agent for curing the composition through the mechanism that the Si—H groups in the molecule undergo hydrosilylation addition reaction with the silicon-bonded alkenyl groups in component (A) to form crosslinks.

(B-1) an organohydrogenpolysiloxane containing at least 6 silicon-bonded hydrogen atoms per molecule and free of an aromatic group (B-2) an organohydrogenpolysiloxane containing 3 to 5 silicon-bonded hydrogen atoms per molecule and free of an aromatic group (B-3) an organohydrogenpolysiloxane containing 1 to 2 silicon-bonded hydrogen atoms per molecule and free of an aromatic group Appropriate as component (B-1) is an organohydrogenpolysiloxane represented by the average compositional formula (II) and containing at least 6, preferably at least 8, more preferably 8 to 100, even more preferably 8 to 50, silicon-bonded hydrogen atoms (Si—H groups) per molecule.

$$R^2{}_b H_c SiO_{(4-b-c)/2} \qquad (II)$$

Herein $R^2$ is each independently a substituted or unsubstituted, $C_1$-$C_{10}$, preferably $C_1$-$C_8$, monovalent hydrocarbon group (exclusive of aromatic group), b is a positive number of 0.7 to 2.1, c is a positive number of 0.001 to 1.0, and b+c is equal to 0.8 to 3.0.

Examples of the silicon-bonded, substituted or unsubstituted, $C_1$-$C_{10}$, preferably $C_1$-$C_8$, monovalent hydrocarbon group (exclusive of aromatic group), represented by $R^2$, include alkyl groups such as methyl, ethyl, propyl, isopropyl, butyl, isobutyl, tert-butyl, pentyl, neopentyl, hexyl, cyclohexyl, octyl, nonyl and decyl, alkenyl groups such as vinyl, allyl, propenyl, isopropenyl, butenyl, hexenyl, cyclohexenyl, and octenyl, and substituted forms of the foregoing in which one or more or all hydrogen atoms are substituted by halogen atoms (e.g., fluorine, bromine or chlorine), cyano or the like, for example, chloromethyl, chloropropyl, bromoethyl, trifluoropropyl and cyanoethyl. Those groups free of aliphatic unsaturation are preferred.

The subscript b is a positive number of 0.7 to 2.1, preferably 0.8 to 2.0, c is a positive number of 0.001 to 1.0, preferably 0.01 to 1.0, and the sum of b+c is 0.8 to 3.0, preferably 1.0 to 2.5. The molecular structure of the organohydrogenpolysiloxane may be linear, cyclic, branched, or three-dimensional network.

In component (B-1), the number of Si—H groups per molecule is at least 6, preferably at least 8, more preferably 8 to 100, and even more preferably 8 to 50. Also, the content of Si—H groups is preferably 0.0001 mol/g to 0.017 mol/g, more preferably 0.002 mol/g to 0.017 mol/g of the organohydrogenpolysiloxane.

Preferred is an organohydrogenpolysiloxane in which the number of silicon atoms per molecule (i.e., average degree of polymerization) is about 6 to about 300, even more preferably about 8 to about 150, and which is liquid at 25° C. The silicon-bonded hydrogen atom may be present at the end of the molecular chain and/or at a position midway of the molecular chain.

Examples of the organohydrogenpolysiloxane as component (B-1) include methylhydrogencyclopolysiloxane, methylhydrogensiloxane/dimethylsiloxane cyclic copolymers, both end trimethylsiloxy-capped methylhydrogenpolysiloxane, both end trimethylsiloxy-capped dimethylsiloxane/methylhydrogensiloxane copolymers, both end dimethylhydrogensiloxy-capped dimethylpolysiloxane, both end dimethylhydrogensiloxy-capped dimethylsiloxane/methylhydrogensiloxane copolymers, copolymers consisting of $(CH_3)_2HSiO_{1/2}$ units, $(CH_3)_3SiO_{1/2}$ units, and $SiO_{4/2}$ units, copolymers consisting of $(CH_3)_2HSiO_{1/2}$ units and $SiO_{4/2}$ units, and substituted forms of the foregoing compounds in which some or all methyl groups are substituted by other alkyl groups or the like.

Component (B-1) may be used singly or in admixture.

Appropriate as component (B-2) is an organohydrogenpolysiloxane represented by the average compositional formula (III) and containing 3 to 5 silicon-bonded hydrogen atoms (Si—H groups) per molecule.

$$R^3{}_d H_e SiO_{(4-d-e)/2} \qquad (III)$$

Herein $R^3$ is each independently a substituted or unsubstituted, $C_1$-$C_{10}$, preferably $C_1$-$C_8$, monovalent hydrocarbon group (exclusive of aromatic group), d is a positive number of 0.7 to 2.1, e is a positive number of 0.001 to 1.0, and d+e is equal to 0.8 to 3.0.

Examples of the silicon-bonded, substituted or unsubstituted, $C_1$-$C_{10}$, preferably $C_1$-$C_8$, monovalent hydrocarbon group (exclusive of aromatic group), represented by $R^3$, are as exemplified above for $R^2$, with those groups free of aliphatic unsaturation being preferred.

The subscript d is a positive number of 0.7 to 2.1, preferably 0.8 to 2.0, e is a positive number of 0.001 to 1.0, preferably 0.01 to 1.0, and the sum of d+e is 0.8 to 3.0, preferably 1.0 to 2.5. The molecular structure of the organohydrogenpolysiloxane may be linear, cyclic, branched, or three-dimensional network.

In component (B-2), the number of Si—H groups per molecule is 3 to 5. Also, the content of Si—H groups is preferably 0.0002 mol/g to 0.017 mol/g, more preferably 0.0004 mol/g to 0.017 mol/g of the organohydrogenpolysiloxane.

Preferred is an organohydrogenpolysiloxane in which the number of silicon atoms per molecule (i.e., average degree of polymerization) is about 3 to about 300, more preferably about 4 to about 150, and which is liquid at 25° C. The silicon-bonded hydrogen atom may be present at the end of the molecular chain and/or at a position midway of the molecular chain. Preferred as component (B-2) is an organohydrogenpolysiloxane which is capped with dimethylhydrogensiloxy at 50 mol % or more, especially 80 to 100 mol % of ends on the average.

Examples of the organohydrogenpolysiloxane as component (B-2) include 1,1,3,3-tetramethyldisiloxane, 1,3,5,7-tetramethylcyclotetrasiloxane, tris(hydrogendimethylsiloxy)methylsilane, methylhydrogencyclopolysiloxane, methylhydrogensiloxane/dimethylsiloxane cyclic copolymers, both end trimethylsiloxy-capped methylhydrogenpolysiloxane, both end trimethylsiloxy-capped dimethylsiloxane/methylhydrogensiloxane copolymers, both end dimethylhydrogensiloxy-capped dimethylpolysiloxane, both end dimethylhydrogensiloxy-capped dimethylsiloxane/methylhydrogensiloxane copolymers, copolymers consisting of $(CH_3)_2HSiO_{1/2}$ units, $(CH_3)_3SiO_{1/2}$ units, and $SiO_{4/2}$ units, copolymers consisting of $(CH_3)_2HSiO_{1/2}$ units and $SiO_{4/2}$ units, and substituted forms of the foregoing compounds in which some or all methyl groups are substituted by other alkyl groups or the like. Of these, both end dimethylhydrogensiloxy-capped dimethylsiloxane/methylhydrogensiloxane copolymers are preferred.

Component (B-2) may be used singly or in admixture.

Appropriate as component (B-3) is an organohydrogenpolysiloxane represented by the average compositional formula (IV) and containing 1 to 2 silicon-bonded hydrogen atoms (Si—H groups) per molecule.

$$R^4{}_fH_gSiO_{(4-f-g)/2} \quad \text{(IV)}$$

Herein $R^4$ is each independently a substituted or unsubstituted, $C_1$-$C_{10}$, preferably $C_1$-$C_8$, monovalent hydrocarbon group (exclusive of aromatic group), f is a positive number of 0.7 to 2.1, g is a positive number of 0.001 to 1.0, and f+g is equal to 0.8 to 3.0.

Examples of the silicon-bonded, substituted or unsubstituted, $C_1$-$C_{10}$, preferably $C_1$-$C_8$, monovalent hydrocarbon group (exclusive of aromatic group), represented by $R^4$, are as exemplified above for $R^2$, with those groups free of aliphatic unsaturation being preferred.

The subscript f is a positive number of 0.7 to 2.1, preferably 0.8 to 2.0, g is a positive number of 0.001 to 1.0, preferably 0.01 to 1.0, and the sum of f+g is 0.8 to 3.0, preferably 1.0 to 2.5. The molecular structure of the organohydrogenpolysiloxane may be linear, cyclic, branched, or three-dimensional network.

In component (B-3), the number of Si—H groups per molecule is 1 to 2. Also, the content of Si—H groups is preferably 0.00009 mol/g to 0.012 mol/g, more preferably 0.0002 mol/g to 0.0085 mol/g of the organohydrogenpolysiloxane.

Preferred is an organohydrogenpolysiloxane in which the number of silicon atoms per molecule (i.e., average degree of polymerization) is about 2 to about 300, more preferably about 3 to about 150, and which is liquid at 25° C. The silicon-bonded hydrogen atom may be present at the end of the molecular chain and/or at a position midway of the molecular chain.

Examples of the organohydrogenpolysiloxane as component (B-3) include methylhydrogensiloxane/dimethylsiloxane cyclic copolymers, both end trimethylsiloxy-capped methylhydrogenpolysiloxane, both end trimethylsiloxy-capped dimethylsiloxane/methylhydrogensiloxane copolymers, both end dimethylhydrogensiloxy-capped dimethylpolysiloxane, dimethylpolysiloxane capped with dimethylhydrogensiloxy at one end and with trimethylsiloxy at the other end of molecular chain, dimethylsiloxane/methylhydrogensiloxane copolymers capped with dimethylhydrogensiloxy at one end and with trimethylsiloxy at the other end of molecular chain, and substituted forms of the foregoing compounds in which some or all methyl groups are substituted by other alkyl groups or the like. Among these, both end dimethylhydrogensiloxy-capped dimethylpolysiloxane is preferred.

Component (B-3) may be used singly or in admixture.

Components (B-1), (B-2) and (B-3) are combined in such amounts that the moles of Si—H groups in the respective components relative to the total moles (total Si—H groups) of silicon-bonded hydrogen atoms (Si—H groups) in components (B-1), (B-2) and (B-3) are as follows. The ratio [Si—H groups in (B-1)]/[total Si—H groups] is preferably 50 mol % to 80 mol %, more preferably 50 mol % to 70 mol %. If this ratio is less than 50 mol %, cure is retarded. If the ratio is more than 80 mol %, rubber becomes too hard. The ratio [Si—H groups in (B-2)]/[total Si—H groups] is preferably 5 mol % to 40 mol %, more preferably 5 mol % to 35 mol %, and even more preferably 5 mol % to 30 mol %. If this ratio is less than 5 mol %, no addition effect is observed. If the ratio is more than 40 mol %, hardness becomes too high. The ratio [Si—H groups in (B-3)]/[total Si—H groups] is preferably 5 mol % to 40 mol %, more preferably 5 mol % to 35 mol %. If this ratio is less than 5 mol %, hardness becomes too high. If the ratio is more than 40 mol %, cure is poor and the cured rubber becomes sticky on the surface.

The total amount of components (B-1), (B-2) and (B-3) blended is preferably such that a molar ratio of the total moles of Si—H groups in the organohydrogenpolysiloxane which is a mixture of components (B-1), (B-2) and (B-3) to the total of alkenyl groups in the composition (specifically amount of alkenyl groups in component (A) or total of alkenyl groups in components (A) and (E) when an alkenyl-containing compound is blended as component (E) to be described below), that is, [total Si—H groups]/[total alkenyl groups] may range from 1/1 to 3/1, preferably from 1.1/1 to 2.5/1. A ratio of less than 1 results in retarded cure, insufficient crosslinking, and sticky rubber whereas a ratio of more than 3 results in too high hardness.

Further, the total amount of components (B-1), (B-2) and (B-3) blended is preferably 0.2 to 20 parts by weight, more preferably 0.3 to 10 parts by weight per 100 parts by weight of component (A).

(C) Fumed silica having a BET specific surface area of at least 130 m²/g Component (C) is fumed silica which is essential to provide the resulting silicone rubber with sufficient strength. The fumed silica should have a BET specific surface area of at least 130 m²/g, typically 130 to 400 m²/g, preferably 130 to 380 m²/g. If the surface area is less than 130 m²/g, no sufficient strength may be obtainable and the molded composition may become less transparent. A surface area of more than 400 m²/g may result in difficult blending and discoloration.

Fumed silica as component (C) is blended in an amount of 5 to 60 parts by weight, preferably 10 to 50 parts by weight per 100 parts by weight of components (A) and (B) combined. Less than 5 pbw of fumed silica fails to obtain sufficient rubber strength whereas more than 60 pbw brings about too high a viscosity to mold.

Often fumed silica used as component (C) is one which has been surface treated to be hydrophobic. Without surface treatment, fumed silica is inefficient to disperse in silicone oil, leading to silica agglomerate formation or difficult blending. The surface treatment of silica may be direct treatment in powder state. Alternatively, silica is surface treated, in the step of mixing silica with component (A), by heat mixing silica together with a silica surface treating agent.

With respect to the treatment procedure, treatment may be performed by general well-known techniques. For example, an untreated silica fine powder and a silica surface treating agent are fed to a mechanical kneading device closed under atmospheric pressure or a fluidized bed, and mixing treatment is performed at room temperature or elevated temperature, optionally in the presence of an inert gas. In some cases, a catalyst is used to promote treatment. The kneading and subsequent drying yields a treated silica fine powder.

As described above, the silica surface treating agent is used for the hydrophobic surface treatment of fumed silica as component (C). Examples of the silica surface treating agent include silazanes such as hexamethyldisilazane and divinyltetramethyldisilazane; silane base coupling agents such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, dimethyldichlorosilane, divinyldimethoxysilane and chloropropyltrimethoxysilane; and organosilicon compounds such as polymethylsiloxane and organohydrogenpolysiloxane. The most preferred treating agents are silane base coupling agents and silazanes.

Notably, the silica surface treating agent is used in an amount of 5 to 75 parts by weight, more preferably 5 to 60 parts by weight per 100 parts by weight of component (C).

(D) Addition Reaction Catalyst

Component (D) is an addition reaction catalyst, examples of which include platinum base catalysts such as platinum black, platinic chloride, chloroplatinic acid, the reaction products of chloroplatinic acid with monohydric alcohols, complexes of chloroplatinic acid with olefins, and platinum bisacetoacetate, palladium base catalysts, and rhodium base catalysts.

The amount of the addition reaction catalyst used may be a catalytic amount, and is typically 0.5 to 1,000 ppm, especially 1 to 500 ppm of platinum group metal (calculated in weight) based on the total weight of components (A) and (B).

(E) Gum-Like Organopolysiloxane

In the inventive composition, component (E) may be blended. Component (E) is an organopolysiloxane having an average degree of polymerization (number average degree of polymerization) of at least 2,000, the organopolysiloxane being gum-like (i.e., non-liquid without self-flowing properties) at 25° C. An organopolysiloxane having the average compositional formula (V) may be used.

$$R^5_h SiO_{(4-h)/2} \quad (V)$$

Herein $R^5$ is each independently a substituted or unsubstituted, $C_1$-$C_{10}$, preferably $C_1$-$C_8$, monovalent hydrocarbon group, and h is a positive number in the range of 1.8 to 2.5, preferably 1.9 to 2.1, more preferably 1.98 to 2.01.

The silicon-bonded, substituted or unsubstituted, $C_1$-$C_{10}$, preferably $C_1$-$C_8$, monovalent hydrocarbon group $R^5$ is as exemplified above for $R^1$. Examples include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl, and phenylpropyl, alkenyl groups such as vinyl, allyl, propenyl, isopropenyl, butenyl, hexenyl, cyclohexenyl, and octenyl, and substituted forms of the foregoing in which one or more or all hydrogen atoms are substituted by halogen atoms. (e.g., fluorine, bromine or chlorine), cyano or the like, for example, chloromethyl, chloropropyl, bromoethyl, trifluoropropyl and cyanoethyl. Preferably at least 90 mol % of all groups R are methyl, with the balance being vinyl.

$R^5$ may or may not contain an alkenyl group, preferably of 2 to 8 carbon atoms, more preferably 2 to 6 carbon atoms, most preferably vinyl. When contained, the content of alkenyl group is preferably up to 0.0026 mol/g, more preferably up to 0.0014 mol/g. If the content of alkenyl group exceeds 0.0026 mol/g, sometimes a curing rate may substantially lower. The alkenyl group may bond to the silicon atom at the end of the molecular chain and/or a silicon atom midway the molecular chain.

Like component (A), the organopolysiloxane basically has a linear structure which has a backbone composed of repeating diorganosiloxane units and is capped at either end of the molecular chain with a triorganosiloxy group although it may partially contain a branched structure or cyclic structure.

In terms of molecular weight, the organopolysiloxane has an average degree of polymerization (DOP) of at least 2,000, typically about 2,000 to about 100,000, and is gum-like (i.e., non-liquid without self-flowing properties) at 25° C. The average DOP is preferably at least 3,000, typically 3,000 to 80,000. An average DOP of less than 2,000 may pose the risks of unavailability of sufficient rubbery feel and sticky surface.

Of the organopolysiloxanes as component (E), the organopolysiloxane free of an alkenyl group in the molecule is exemplified by a molecular chain both end triorganosiloxy-capped diorganopolysiloxane gum. Examples of the organopolysiloxane containing an alkenyl group in the molecule include molecular chain both end diorganoalkenylsiloxy-capped diorganopolysiloxane gum, molecular chain both end organodialkenylsiloxy-capped diorganopolysiloxane gum, molecular chain both end trialkenylsiloxy-capped diorganopolysiloxane gum, molecular chain both end triorganosiloxy-capped diorganosiloxane/organoalkenylsiloxane copolymer gum, molecular chain both end diorganoalkenylsiloxy-capped diorganosiloxane/organoalkenylsiloxane copolymer gum, and diorganosiloxane/organoalkenylsiloxane copolymer gum capped with diorganoalkenylsiloxy at one end and with triorganosiloxy at the other end of the molecular chain. Preferred are molecular chain both end triorganosiloxy-capped diorganopolysiloxane gum, molecular chain both end diorganoalkenylsiloxy-capped diorganopolysiloxane gum, molecular chain both end triorganosiloxy-capped diorganosiloxane/organoalkenylsiloxane copolymer gum, and molecular chain both end diorganoalkenylsiloxy-capped diorganosiloxane/organoalkenylsiloxane copolymer gum. It is noted that the term "organo" group in each siloxane has the same meaning as the substituted or unsubstituted monovalent hydrocarbon group (exclusive of alkenyl) represented by R in formula (V).

Component (E) is optional. When used, the amount of component (E) is preferably 1 to 200 parts by weight, more preferably 3 to 150 parts by weight, and even more preferably 5 to 120 parts by weight per 100 parts by weight of component (A). Less than 1 pbw of component (E) may fail to exert the addition effect whereas more than 200 pbw may cause the composition to have a too high viscosity to mold.

(F) Organopolysiloxane Free of a Substituent Active to Addition Reaction

In the inventive composition, component (F) may be blended. Component (F) is an organopolysiloxane having an average degree of polymerization (number average DOP) of up to 500 and free of a substituent active to addition reaction, the organopolysiloxane being liquid at 25° C. An organopolysiloxane having the average compositional formula (VI) may be used.

$$R^6_i SiO_{(4-i)/2} \quad (VI)$$

Herein $R^6$ is each independently a substituted or unsubstituted, $C_1$-$C_{10}$, preferably $C_1$-$C_8$, monovalent hydrocarbon group free of aliphatic unsaturation, and i is a positive number in the range of 1.8 to 2.5, preferably 1.9 to 2.1, more preferably 1.98 to 2.01.

Example of the silicon-bonded, substituted or unsubstituted, $C_1$-$C_{10}$, preferably $C_1$-$C_8$, monovalent hydrocarbon group free of aliphatic unsaturation, represented by $R^6$ include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl, and phenylpropyl, and substituted forms of the foregoing in which one or more or all hydrogen atoms are substituted by halogen atoms (e.g., fluorine, bromine or chlorine), cyano or the like, for example, chloromethyl, chloropropyl, bromoethyl, trifluoropropyl and cyanoethyl. At least 90 mol % of all groups $R^6$ are methyl, and a substituent active to addition reaction is not contained.

Like component (A), the organopolysiloxane basically has a linear structure which has a backbone composed of repeating diorganosiloxane units and is capped at either end of the molecular chain with a triorganosiloxy group although it may partially contain a branched structure or cyclic structure.

In terms of molecular weight, the organopolysiloxane has an average degree of polymerization (DOP) of up to 500 and is liquid at 25° C., the average DOP being preferably 20 to 500, more preferably 30 to 300. An organopolysiloxane with an average DOP of less than 20 may volatilize off during blending or during or after vulcanization. With an average DOP in excess of 500, the cured rubber may become sticky on its surface.

Examples of the organopolysiloxane as component (F) include molecular chain both end trimethylsiloxy-capped dimethylpolysiloxane, molecular chain both end trimethylsiloxy-capped phenylmethylpolysiloxane, molecular chain both end trimethylsiloxy-capped diphenylpolysiloxane, molecular chain both end trimethylsiloxy-capped dimethylsiloxane/methylphenylsiloxane copolymers, and molecular chain both end trimethylsiloxy-capped dimethylsiloxane/diphenylsiloxane copolymers.

Component (F) is optional. When used, the amount of component (F) is preferably 1 to 200 parts by weight, more preferably 3 to 150 parts by weight, and even more preferably 5 to 120 parts by weight per 100 parts by weight of component (A). Less than 1 pbw of component (E) may fail to exert the addition effect whereas more than 200 pbw may result in a too low rubber strength.

Other components may be blended in the addition-curable liquid silicone rubber composition of the invention, if necessary. Included are fillers such as precipitated silica, quartz powder, diatomaceous earth, and calcium carbonate; electroconductive agents such as carbon black, conductive zinc white, and metal powders; hydrosilylation reaction inhibitors such as nitrogen-containing compounds, acetylene compounds, phosphorus compounds, nitrile compounds, carboxylates, tin compounds, mercury compounds, and sulfur compounds; heat resistance improvers such as iron oxide and cerium oxide; internal parting agents such as dimethylsilicone oil; tackifiers (typically organosilicon compounds such as alkoxysilanes containing at least one functional group selected from alkenyl, epoxy, amino, (meth)acryloxy and mercapto groups in the molecule, and free of a Si—H group in the molecule); and thixotropic agents.

The cure speed of the addition-curable silicone rubber composition is evaluated in terms of measurement at 165° C. for 3 minutes by a cure tester (e.g., rotorless disc rheometer or moving die rheometer (MDR)) wherein T10 (in sec) is a 10% cure time (i.e., a time taken from the start of measurement until the torque value reaches 10% of the maximum torque value over 3 minutes from the start of measurement, at 165° C.), and T90 (in sec) is a 90% cure time (i.e., a time taken from the start of measurement until the torque value reaches 90% of the maximum torque value over 3 minutes from the start of measurement, at 165° C.). With a focus on molding efficiency, T10 is preferably at least 3 seconds, more preferably at least 5 seconds. A T10 value of shorter than 3 seconds indicates a possibility that the material fails to fill into every corner of a mold upon molding. T90 is preferably up to 60 seconds, more preferably up to 50 seconds. A T90 value of longer than 60 seconds indicates a redundant molding cycle which may be uneconomical.

The silicone rubber composition may be molded and cured in accordance with standard methods. An appropriate molding method used herein is liquid injection molding. For curing, heat treatment may be carried out at 100 to 230° C. for 3 seconds to 30 minutes, preferably at 110 to 210° C. for 5 seconds to 20 minutes, more preferably at 120 to 200° C. for 5 seconds to 10 minutes. Optionally, this may be followed by post-cure (or secondary vulcanization) at 80 to 230° C., especially 100 to 210° C. for 10 minutes to 24 hours, especially 30 minutes to 10 hours.

When the silicone rubber composition of the invention is press cured at 120° C. for 10 minutes and post cured at 150° C. for 1 hour into a silicone rubber elastomer, the elastomer is a low hardness silicone rubber having a hardness of about 5 to about 15 on Durometer type A scale as measured according to JIS K 6253-3:2012, and is preferably at the same time a silicone rubber having high strength despite low hardness, as demonstrated by a tear strength (crescent test piece) of at least 10 kN/m, more preferably at least 12 kN/m as measured according to JIS K 6252:2007. In order that the silicone rubber obtained from the composition have the above-defined values of hardness and strength, components (A) to (F) are combined in an appropriate proportion (weight ratio) to formulate the composition.

The addition-curable liquid silicone rubber composition is effectively curable and yields a silicone rubber having a low hardness and a high tear strength after curing. The composition is thus useful as bottle nipples, mask material and the like.

EXAMPLES

Examples and Comparative Examples are given below by way of illustration of the invention and not by way of limitation. All parts are by weight. The average degree of polymerization (DOP) is a number average DOP.

Example 1

Molecular both end dimethylvinylsiloxy-capped dimethylpolysiloxane (A1) having an average DOP of 750, 65 parts, was mixed with 40 parts of fumed silica (C1) having a BET specific surface area of 300 m$^2$/g (Aerosil 300 by Nippon Aerosil Co.), 8 parts of hexamethyldisilazane, 0.1 part of 1,3-divinyl-1,1,3,3-tetramethyldisilazane, and 2.0 parts of water at 25° C. for 30 minutes. The mixture was heated at 150° C., continuously stirred for 3 hours, and cooled, obtaining a silicone rubber base.

To 105 parts of the silicone rubber base, 25 parts of the dimethylpolysiloxane (A1), 40 parts of both end dimethylvinylsiloxy-capped dimethylpolysiloxane gum (E1) having an average DOP of 8,000, and 45 parts of both end trimethylsiloxy-capped dimethylpolysiloxane (F1) having an average DOP of 60 and free of vinyl in the molecule were added, followed by stirring for 30 minutes. Further, 0.53 part of methylhydrogen-dimethylpolysiloxane (B-1-1) capped at both ends with trimethylsiloxy and containing, on the average, 12 Si—H groups on pendant (average DOP 25, Si—H content 0.0070 mol/g), 1.32 parts of methylhydrogen-dimethylpolysiloxane (B-2-1) capped at both ends with dimethylhydrogensiloxy and containing, on the average, 2 Si—H groups on pendant (average DOP 40, Si—H content 0.0014 mol/g), and 1.35 parts of dimethylpolysiloxane (B-3-1) capped at both ends with dimethylhydrogensiloxy and free of a Si—H group on pendant (average DOP 20, Si—H content 0.0014 mol/g) as a crosslinker, and 0.025 part of ethynylcyclohexanol as a reaction inhibitor were added to the mixture, which was continuously stirred for 15 minutes, obtaining a silicone rubber mixture.

It is noted that the molar ratios of Si—H groups in components (B-1-1), (B-2-1) and (B-3-1) relative to the total amount of Si—H groups in the overall mixture are such that the ratio of component (B-1-1) is 50 mol %, the ratio of component (B-2-1) is 25 mol %, and the ratio of component (B-3-1) is 25 mol %, and the molar ratio of the total amount of Si—H groups to the total amount of vinyl groups in the overall composition (Si—H groups/vinyl groups) is 2.0.

The silicone rubber mixture was further mixed with 0.05 part of a platinum catalyst (Pt concentration 1 wt %) to form a silicone rubber composition. The composition was measured for cure at 165° C. for 3 minutes by a rheometer MDR2000 (Alpha Technologies), with the results shown in Table 1. Also, the composition was press cured at 120° C. for 10 minutes and post-cured in an oven at 150° C. for 1 hour into a cured product, which was measured for hardness on Durometer type A scale according to JIS K 6253-3:2012 and for tear strength on a crescent test piece according to JIS K 6252:2007, and the state of rubber surface was judged by finger touch, with the results shown in Table 1.

Example 2

Molecular both end dimethylvinylsiloxy-capped dimethylpolysiloxane (A1) having an average DOP of 750, 65 parts, was mixed with 40 parts of fumed silica (C1) having a BET specific surface area of 300 m²/g (Aerosil 300 by Nippon Aerosil Co.), 8 parts of hexamethyldisilazane, 0.1 part of 1,3-divinyl-1,1,3,3-tetramethyldisilazane, and 2.0 parts of water at 25° C. for 30 minutes. The mixture was heated at 150° C., continuously stirred for 3 hours, and cooled, obtaining a silicone rubber base.

To 105 parts of the silicone rubber base, 25 parts of the dimethylpolysiloxane (A1), 40 parts of both end dimethylvinylsiloxy-capped dimethylpolysiloxane gum (E1) having an average DOP of 8,000, and 40 parts of both end trimethylsiloxy-capped dimethylpolysiloxane (F1) having an average DOP of 60 and free of vinyl in the molecule were added, followed by stirring for 30 minutes. Further, 0.57 part of methylhydrogen-dimethylpolysiloxane (B-1-1) capped at both ends with trimethylsiloxy and containing, on the average, 12 Si—H groups on pendant (average DOP 25, Si—H content 0.0070 mol/g), 0.47 part of methylhydrogen-dimethylpolysiloxane (B-2-1) capped at both ends with dimethylhydrogensiloxy and containing, on the average, 2 Si—H groups on pendant (average DOP 40, Si—H content 0.0014 mol/g), and 1.46 parts of dimethylpolysiloxane (B-3-1) capped at both ends with dimethylhydrogensiloxy and free of a Si-L group on pendant (average DOP 20, Si—H content 0.0014 mol/g) as a crosslinker, and 0.025 part of ethynylcyclohexanol as a reaction inhibitor were added to the mixture, which was continuously stirred for 15 minutes, obtaining a silicone rubber mixture.

It is noted that the molar ratios of Si—H groups in components (B-1-1), (B-2-1) and (B-3-1) relative to the total amount of Si—H groups in the overall mixture are such that the ratio of component (B-1-1) is 60 mol %, the ratio of component (B-2-1) is 10 mol %, and the ratio of component (B-3-1) is 30 mol %, and the molar ratio of the total amount of Si—H groups to the total amount of vinyl groups in the overall composition (Si—H groups/vinyl groups) is 18.

The silicone rubber mixture was further mixed with 0.05 part of a platinum catalyst (Pt concentration 1 wt %) to form a silicone rubber composition. The composition was measured for cure at 165° C. for 3 minutes by a rheometer MDR2000 (Alpha Technologies), with the results shown in Table 1. Also, the composition was press cured at 120° C. for 10 minutes and post-cured in an oven at 150° C. for 1 hour into a cured product, which was measured for hardness on Durometer type A scale according to JIS K 6253-3:2012 and for tear strength on a crescent test piece according to JIS K 6252:2007, and the state of rubber surface was judged by finger touch, with the results shown in Table 1.

Comparative Example 1

Molecular both end dimethylvinylsiloxy-capped dimethylpolysiloxane (A1) having an average DOP of 750, 65 parts, was mixed with 40 parts of fumed silica (C1) having a BET specific surface area of 300 m²/g (Aerosil 300 by Nippon Aerosil Co.), 8 parts of hexamethyldisilazane, 0.1 part of 1,3-divinyl-1,1,3,3-tetramethyldisilazane, and 2.0 parts of water at 25° C. for 30 minutes. The mixture was heated at 150° C., continuously stirred for 3 hours, and cooled, obtaining a silicone rubber base.

To 105 parts of the silicone rubber base, 25 parts of the dimethylpolysiloxane (A1), 40 parts of both end dimethylvinylsiloxy-capped dimethylpolysiloxane gum (E1) having an average DOP of 8,000, and 60 parts of both end trimethylsiloxy-capped dimethylpolysiloxane (F1) having an average DOP of 60 and free of vinyl in the molecule were added, followed by stirring for 30 minutes. Further, 0.68 part of methylhydrogen-dimethylpolysiloxane (B-1-1) capped at both ends with trimethylsiloxy and containing, on the average, 12 Si—H groups on pendant (average DOP 25, Si—H content 0.0070 mol/g) and 1.15 parts of dimethylpolysiloxane (B-3-1) capped at both ends with dimethylhydrogensiloxy and free of a Si—H group on pendant (average DOP 20, Si—H content 0.0014 mol/g) as a crosslinker, and 0.025 part of ethynylcyclohexanol as a reaction inhibitor were added to the mixture, which was continuously stirred for 15 minutes, obtaining a silicone rubber mixture.

It is noted that the molar ratios of Si—H groups in components (B-1-1) and (B-3-1) relative to the total amount of Si—H groups in the overall mixture are such that the ratio of component (B-1-1) is 75 mol %, and the ratio of component (B-3-1) is 25 mol %, and the molar ratio of the total amount of Si—H groups to the total amount of vinyl groups in the overall composition (Si—H groups/vinyl groups) is 1.7.

The silicone rubber mixture was further mixed with 0.05 part of a platinum catalyst (Pt concentration 1 wt %) to form a silicone rubber composition. The composition was measured for cure at 165° C. for 3 minutes by a rheometer MDR2000 (Alpha Technologies), with the results shown in Table 1. Also, the composition was press cured at 120° C. for 10 minutes and post-cured in an oven at 150° C. for 1 hour into a cured product, which was measured for hardness on Durometer type A scale according to JIS K 6253-3:2012 and for tear strength on a crescent test piece according to JIS K 6252:2007, and the state of rubber surface was judged by finger touch, with the results shown in Table 1.

Comparative Example 2

Molecular both end dimethylvinylsiloxy-capped dimethylpolysiloxane (A1) having an average DOP of 750, 65 parts, was mixed with 40 parts of fumed silica (C1) having a BET specific surface area of 300 m²/g (Aerosil 300 by Nippon Aerosil Co.), 8 parts of hexamethyldisilazane, 0.1 part of 1,3-divinyl-1,1,3,3-tetramethyldisilazane, and 2.0 parts of water at 25° C. for 30 minutes. The mixture was heated at 150° C., continuously stirred for 3 hours, and cooled, obtaining a silicone rubber base.

To 105 parts of the silicone rubber base, 25 parts of the dimethylpolysiloxane (A1), 40 parts of both end dimethylvinylsiloxy-capped dimethylpolysiloxane gum (E1) having an average DOP of 8,000, and 40 parts of both end trimethylsiloxy-capped dimethylpolysiloxane (F1) having an average DOP of 60 and free of vinyl in the molecule were added, followed by stirring for 30 minutes. Further, 0.54 part of methylhydrogen-dimethylpolysiloxane (B-1-1) capped at both ends with trimethylsiloxy and containing, on the average, 12 Si—H groups on pendant (average DOP 25, Si—H content 0.0070 mol/g) and 1.84 parts of dimethylpolysiloxane (B-3-1) capped at both ends with dimethylhydrogensiloxy and free of a Si—H group on pendant (average DOP 20, Si—H content 0.0014 mol/g) as a crosslinker, and 0.025 part of ethynylcyclohexanol as a reaction inhibitor were added to the mixture, which was continuously stirred for 15 minutes, obtaining a silicone rubber mixture.

It is noted that the molar ratios of Si—H groups in components (B-1-1) and (B-3-1) relative to the total amount of Si—H groups in the overall mixture are such that the ratio of component (B-1-1) is 60 mol % and the ratio of component (B-3-1) is 40 mol %, and the molar ratio of the total amount of Si—H groups to the total amount of vinyl groups in the overall composition (Si—H groups/vinyl groups) is 1.7.

The silicone rubber mixture was further mixed with 0.05 part of a platinum catalyst (Pt concentration 1 wt %) to form a silicone rubber composition. The composition was measured for cure at 165° C. for 3 minutes by a rheometer MDR2000 (Alpha Technologies), with the results shown in Table 1. Also, the composition was press cured at 120° C. for 10 minutes and post-cured in an oven at 150° C. for 1 hour into a cured product, which was measured for hardness on Durometer type A scale according to JIS K 6253-3:2012 and for tear strength on a crescent test piece according to JIS K 6252:2007, and the state of rubber surface was judged by finger touch, with the results shown in Table 1.

Comparative Example 3

Molecular both end dimethylvinylsiloxy-capped dimethylpolysiloxane (A1) having an average DOP of 750, 65 parts, was mixed with 40 parts of fumed silica (C1) having a BET specific surface area of 300 m²/g (Aerosil 300 by Nippon Aerosil Co.), 8 parts of hexamethyldisilazane, 0.1 part of 1,3-divinyl-1,1,3,3-tetramethyldisilazane, and 2.0 parts of water at 25° C. for 30 minutes. The mixture was heated at 150° C., continuously stirred for 3 hours, and cooled, obtaining a silicone rubber base.

To 105 parts of the silicone rubber base, 25 parts of the dimethylpolysiloxane (A1), 40 parts of both end dimethylvinylsiloxy-capped dimethylpolysiloxane gum (E1) having an average DOP of 8,000, and 45 parts of both end trimethylsiloxy-capped dimethylpolysiloxane (F1) having an average DOP of 60 and free of vinyl in the molecule were added, followed by stirring for 30 minutes. Further, 5.28 parts of methylhydrogen-dimethylpolysiloxane (B-2-1) capped at both ends with dimethylhydrogensiloxy and containing, on the average, 2 Si—H groups on pendant (average DOP 40, Si—H content 0.0014 mol/g) as a crosslinker, and 0.025 part of ethynylcyclohexanol as a reaction inhibitor were added to the mixture, which was continuously stirred for 15 minutes, obtaining a silicone rubber mixture.

It is noted that the molar ratio of Si—H groups in component (B-2-1) relative to the total amount of Si—H groups in the overall mixture is such that the ratio of component (B-2-1) is 100 mol %, and the molar ratio of the total amount of Si—H groups to the total amount of vinyl groups in the overall composition (Si—H groups/vinyl groups) is 2.0.

The silicone rubber mixture was further mixed with 0.05 part of a platinum catalyst (Pt concentration 1 wt %) to form a silicone rubber composition. The composition was measured for cure at 165° C. for 3 minutes by a rheometer MDR2000 (Alpha Technologies), with the results shown in Table 1. Also, the composition was press cured at 120° C. for 10 minutes and post-cured in an oven at 150° C. for 1 hour into a cured product, which was measured for hardness on Durometer type A scale according to JIS K 6253-3:2012 and for tear strength on a crescent test piece according to JIS K 6252:2007, and the state of rubber surface was judged by finger touch, with the results shown in Table 1.

Comparative Example 4

Molecular both end dimethylvinylsiloxy-capped dimethylpolysiloxane (A1) having an average DOP of 750, 65 parts, was mixed with 40 parts of fumed silica (C1) having a BET specific surface area of 300 m²/g (Aerosil 300 by Nippon Aerosil Co.), 8 parts of hexamethyldisilazane, 0.1 part of 1,3-divinyl-1,1,3,3-tetramethyldisilazane, and 2.0 parts of water at 25° C. for 30 minutes. The mixture was heated at 150° C., continuously stirred for 3 hours, and cooled, obtaining a silicone rubber base.

To 105 parts of the silicone rubber base, 25 parts of the dimethylpolysiloxane (A1), 40 parts of both end dimethylvinylsiloxy-capped dimethylpolysiloxane gum (E1) having an average DOP of 8,000, and 45 parts of both end trimethylsiloxy-capped dimethylpolysiloxane (F1) having an average DOP of 60 and free of vinyl in the molecule were added, followed by stirring for 30 minutes. Further, 0.32 part of methylhydrogen-dimethylpolysiloxane (B-1-1) capped at both ends with trimethylsiloxy and containing, on the average, 12 Si—H groups on pendant (average DOP 25, Si—H content 0.0070 mol/g) and 3.69 parts of methylhydrogen-dimethylpolysiloxane (B-2-1) capped at both ends with dimethylhydrogensiloxy and containing, on the average, 2 Si—H groups on pendant (average DOP 40, Si—H content 0.0014 mol/g) as a crosslinker, and 0.025 part of ethynylcyclohexanol as a reaction inhibitor were added to the mixture, which was continuously stirred for 15 minutes, obtaining a silicone rubber mixture.

It is noted that the molar ratios of Si—H groups in components (B-1-1) and (B-2-1) relative to the total amount of Si—H groups in the overall mixture are such that the ratio of component (B-1-1) is 30 mol %, and the ratio of component (B-2-1) is 70 mol %, and the molar ratio of the total amount of Si—H groups to the total amount of vinyl groups in the overall composition (Si—H groups/vinyl groups) is 2.0.

The silicone rubber mixture was further mixed with 0.05 part of a platinum catalyst (Pt concentration 1 wt %) to form a silicone rubber composition. The composition was measured for cure at 165° C. for 3 minutes by a rheometer MDR2000 (Alpha Technologies), with the results shown in Table 1. Also, the composition was press cured at 120° C. for 10 minutes and post-cured in an oven at 150° C. for 1 hour into a cured product, which was measured for hardness on Durometer type A scale according to JIS K 6253-3:2012 and for tear strength on a crescent test piece according to JIS K 6252:2007, and the state of rubber surface was judged by finger touch, with the results shown in Table 1.

Comparative Example 5

Molecular both end dimethylvinylsiloxy-capped dimethylpolysiloxane (A1) having an average DOP of 750, 65 parts, was mixed with 40 parts of fumed silica (C1) having a BET specific surface area of 300 m²/g (Aerosil 300 by Nippon Aerosil Co.), 8 parts of hexamethyldisilazane, 0.1 part of 1,3-divinyl-1,1,3,3-tetramethyldisilazane, and 2.0 parts of water at 25° C. for 30 minutes. The mixture was heated at 150° C., continuously stirred for 3 hours, and cooled, obtaining a silicone rubber base.

To 105 parts of the silicone rubber base, 25 parts of the dimethylpolysiloxane (A1), 40 parts of both end dimethylvinylsiloxy-capped dimethylpolysiloxane gum (E1) having an average DOP of 8,000, and 30 parts of both end trimethylsiloxy-capped dimethylpolysiloxane (F1) having an average DOP of 60 and free of vinyl in the molecule were added, followed by stirring for 30 minutes. Further, 2.96 parts of methylhydrogen-dimethylpolysiloxane (B-2-1) capped at both ends with dimethylhydrogensiloxy and containing, on the average, 2 Si—H groups on pendant (average DOP 40, Si—H content 0.0014 mol/g) and 0.76 part of dimethylpolysiloxane (B-3-1) capped at both ends with dimethylhydrogensiloxy and free of a Si—H group on pendant (average DOP 20, Si—H content 0.0014 mol/g) as a crosslinker, and 0.025 part of ethynylcyclohexanol as a reaction inhibitor were added to the mixture, which was continuously stirred for 15 minutes, obtaining a silicone rubber mixture.

It is noted that the molar ratios of Si—H groups in components (B-2-1) and (B-3-1) relative to the total amount of Si—H groups in the overall mixture are such that the ratio of component (B-2-1) is 80 mol % and the ratio of component (B-3-1) is 20 mol %, and the molar ratio of the total amount of Si—H groups to the total amount of vinyl groups in the overall composition (Si—H groups/vinyl groups) is 1.4.

The silicone rubber mixture was further mixed with 0.05 part of a platinum catalyst (Pt concentration 1 wt %) to form a silicone rubber composition. The composition was measured for cure at 165° C. for 3 minutes by a rheometer MDR2000 (Alpha Technologies), with the results shown in Table 1. Also, the composition was press cured at 120° C. for 10 minutes and post-cured in an oven at 150° C. for 1 hour into a cured product, which was measured for hardness on Durometer type A scale according to JIS K 6253-3:2012 and for tear strength on a crescent test piece according to JIS K 6252:2007, and the state of rubber surface was judged by finger touch, with the results shown in Table 1.

TABLE 1

| | Example | | Comparative Example | | | | |
|---|---|---|---|---|---|---|---|
| | 1 | 2 | 1 | 2 | 3 | 4 | 5 |
| Care T10 (sec) | 10 | 10 | 10 | 11 | 10 | 11 | 11 |
| Cure T90 (sec) | 39 | 32 | 29 | 65 | 78 | 65 | 67 |
| Hardness, Durometer type A | 10 | 11 | 11 | 11 | 11 | 13 | 10 |
| Tear strength (kN/m) | 14 | 15 | 8 | 16 | 13 | 12 | 20 |
| Rubber surface stickiness | unfound | unfound | unfound | found | unfound | unfound | found |

The invention claimed is:

1. An addition-curable liquid silicone rubber composition comprising the following components (A) to (D):
   (A) 100 parts by weight of an alkenyl-containing organopolysiloxane having at least two silicon-bonded alkenyl groups per molecule and an average degree of polymerization of up to 1,500, the organopolysiloxane being liquid at 25° C.,
   (B) an organohydrogenpolysiloxane consisting of the following components (B-1) to (B-3):
   (B-1) an organohydrogenpolysiloxane containing at least 6 silicon-bonded hydrogen atoms per molecule and free of an aromatic group,
   (B-2) an organohydrogenpolysiloxane containing 3 to 5 silicon-bonded hydrogen atoms per molecule and free of an aromatic group, and
   (B-3) an organohydrogenpolysiloxane containing 1 or 2 silicon-bonded hydrogen atoms per molecule and free of an aromatic group,
   the moles of Si—H groups in the respective components relative to the total moles (total Si—H groups) of silicon-bonded hydrogen atoms (Si—H groups) in components (B-1), (B-2) and (B-3) are such that [Si—H groups in (B-1)]]/[total Si—H groups] is 50 mol % to 80 mol %, [Si—H groups in (B-2)]]/[total Si—H groups] is 5 mol % to 40 mol %, and [Si—H groups in (B-3)]]/[total Si—H groups] is 5 mol % to 40 mol %, and a ratio of the moles of total Si—H groups to the total moles of alkenyl groups in the composition (total alkenyl groups) is such that [total Si—H groups]/[total alkenyl groups] is 1/1 to 3/1,
   (C) fumed silica having a BET specific surface area of at least 130 m²/g, in an amount of 5 to 60 parts by weight per 100 parts by weight of components (A) and (B) combined, and
   (D) an addition reaction catalyst in an amount of 0.5 to 1,000 ppm of platinum group metal based on the total weight of components (A) and (B).

2. The addition-curable liquid silicone rubber composition of claim 1, further comprising (E) an organopolysiloxane having an average degree of polymerization of at least 2,000, the organopolysiloxane being gum-like at 25° C., in an amount of 1 to 200 parts by weight per 100 parts by weight of component (A).

3. The addition-curable liquid silicone rubber composition of claim 1 or 2, further comprising (F) an organopolysiloxane having an average degree of polymerization of up to 500 and free of a substituent active to addition reaction, the organopolysiloxane being liquid at 25° C., in an amount of 1 to 200 parts by weight per 100 parts by weight of component (A).

4. The addition-curable liquid silicone rubber composition of claim 1 wherein component (B-2) is an organohydrogenpolysiloxane capped with a dimethylhydrogensiloxy group in an amount of at least 50 mol % of ends on the average.

5. The addition-curable liquid silicone rubber composition of claim 1 wherein a molded composition after curing has a hardness of 5 to 15 on Durometer type A scale according to JIS K 6253-3:2012.

6. The addition-curable liquid silicone rubber composition of claim 1 wherein a molded composition after curing has a tear strength of at least 10 kN/m as measured on a crescent test piece according to JIS K 6252:2007.

7. The addition-curable liquid silicone rubber composition of claim 1 wherein in a vulcanization test using a torsional oscillating conical die type vulcanization tester according to JIS K 6300-2:2001, provided that T10 is a 10% cure time and T90 is a 90% cure time during measurement at 165° C. for 3 minutes, T10 is at least 3 seconds and T90 is up to 60 seconds.

* * * * *